(12) United States Patent
Chien et al.

(10) Patent No.: US 8,104,979 B2
(45) Date of Patent: Jan. 31, 2012

(54) KEYBOARD WITH KEYSTROKE MODULE MOVABLY DISPOSED TO AN OPENING

(75) Inventors: Shih-Po Chien, Taipei (TW); Yu-Chuan Chang, Taipei (TW); Shih-Yu Lin, Taipei (TW); Chang-Chi Lai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 741 days.

(21) Appl. No.: 12/258,914

(22) Filed: Oct. 27, 2008

(65) Prior Publication Data

US 2009/0135554 A1    May 28, 2009

(30) Foreign Application Priority Data

Nov. 28, 2007  (TW) ................................ 96145157 A (51) Int. Cl.
*G06F 3/02* (2006.01)
(52) U.S. Cl. ........................................ 400/472; 400/477
(58) Field of Classification Search .................. 400/472, 400/473, 480, 485, 477; 361/679.09, 679.11, 361/679.13, 679.2
See application file for complete search history.

(56) References Cited

U.S. PATENT DOCUMENTS

| 5,768,093 A * | 6/1998 | Howell et al. ............ 361/679.13 |
| 6,094,191 A * | 7/2000 | Watanabe et al. ............. 345/168 |
| 6,314,274 B1 * | 11/2001 | Kumagai ..................... 455/90.3 |
| 6,773,178 B2 | 8/2004 | Miyako et al. |
| 6,962,452 B2 | 11/2005 | Cheng |
| 2003/0122690 A1 | 7/2003 | Hsu |
| 2004/0066373 A1 | 4/2004 | Wu |
| 2010/0134329 A1 * | 6/2010 | Wang et al. ..................... 341/24 |
| 2010/0149106 A1 * | 6/2010 | Gray ............................. 345/169 |

FOREIGN PATENT DOCUMENTS

| CN | 1249565 | | 4/2006 |
| EP | 235733 A1 | * | 9/1987 |
| EP | 1150476 A2 | | 10/2001 |
| JP | 05298000 A | * | 11/1993 |
| JP | 07146741 | | 6/1995 |

* cited by examiner

*Primary Examiner* — Daniel J Colilla
(74) *Attorney, Agent, or Firm* — Muncy, Geissler, Olds & Lowe, PLLC (57) ABSTRACT

A keyboard includes a first housing having a plurality of first magnetic elements, a keystroke module having a key portion disposed on the first housing, a second housing combining with the first housing and has an opening, and an actuating assembly. The keystroke module is disposed corresponding to the opening. The actuating assembly is disposed movably on the second housing and has a plurality of second magnetic elements. The keystroke module is not protruded from the opening and is at a packing position. When the actuating assembly is moved along an actuating direction, at least one first magnetic element and at least one second magnetic element attract to each other to shorten the distance, which brings the second housing to move relatively to the first housing so that the key portion of the keystroke module passes though the opening and is at a using position.

17 Claims, 10 Drawing Sheets

KEYBOARD WITH KEYSTROKE MODULE MOVABLY DISPOSED TO AN OPENING

CROSS REFERENCE TO RELATED APPLICATIONS

This Non-provisional application claims priority under 35 U.S.C. §119(a) on Patent Application No(s). 096145157 filed in Taiwan, Republic of China on Nov. 28, 2007, the entire contents of which are hereby incorporated by reference.

BACKGROUND OF THE INVENTION

1. Field of Invention

The invention relates to a keyboard and, in particular, to a keyboard that can be packed.

2. Related Art

The keyboard is the main input tool of the portable electronic device for the time being. The portable electronic device in the market, such as the PDA or ultra-mobile PC (UMPC), is designed to be small in size and with a large display screen. Therefore, the input module of the portable electronic device is usually a touch panel that can be operated with a stylus or a finger. Nonetheless, if a large amount of data has to be inputted, the input speed of such device will be slowed down, which dose not satisfy the actual need. For this, the conventional portable electronic device is usually connected with an external keyboard so it would be easier for the users to enter the instruction.

Figure 1A:
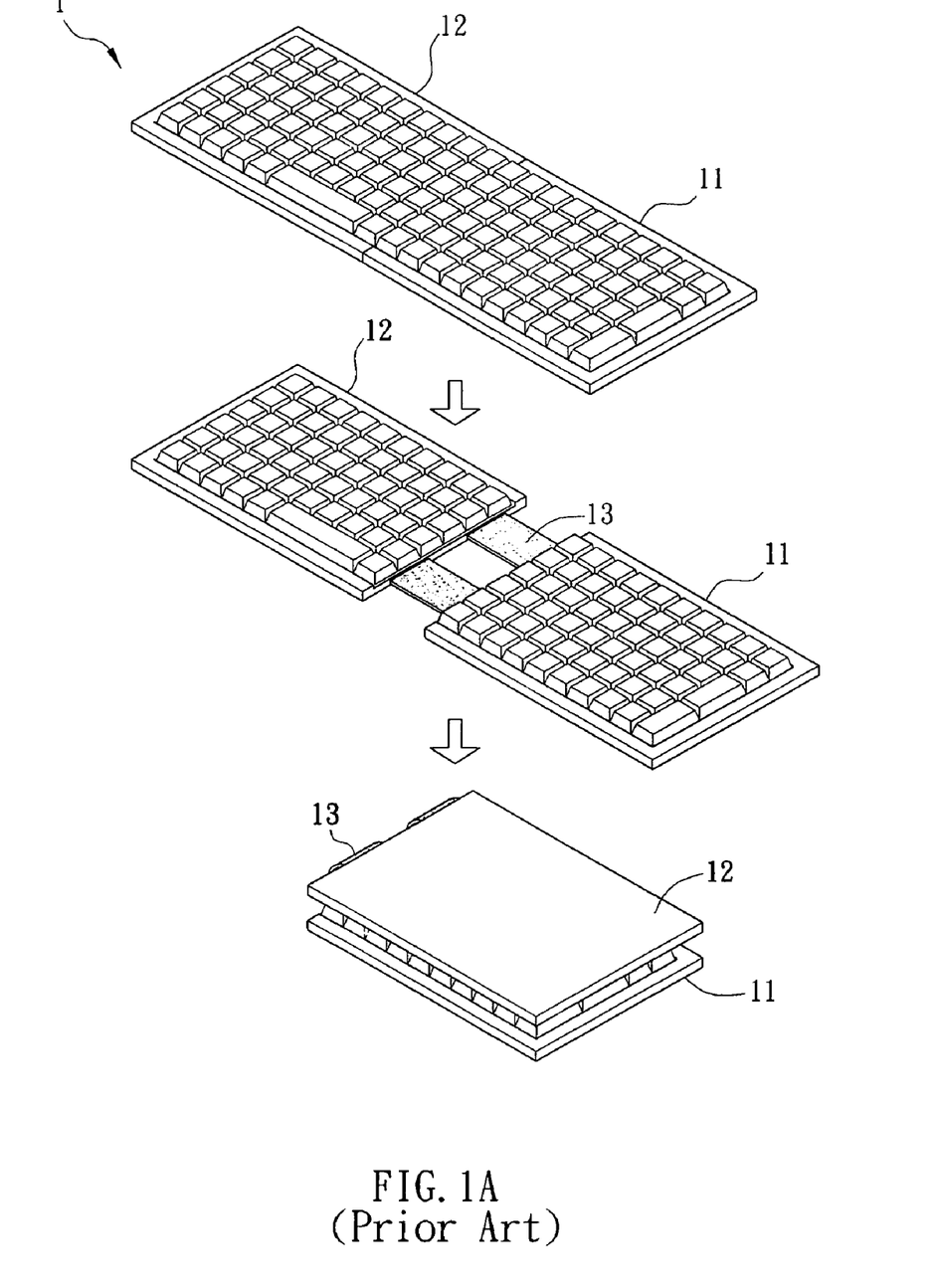
FIG. 1A is a schematic diagram of a conventional foldable keyboard of a portable electronic device.
Figure 1B:
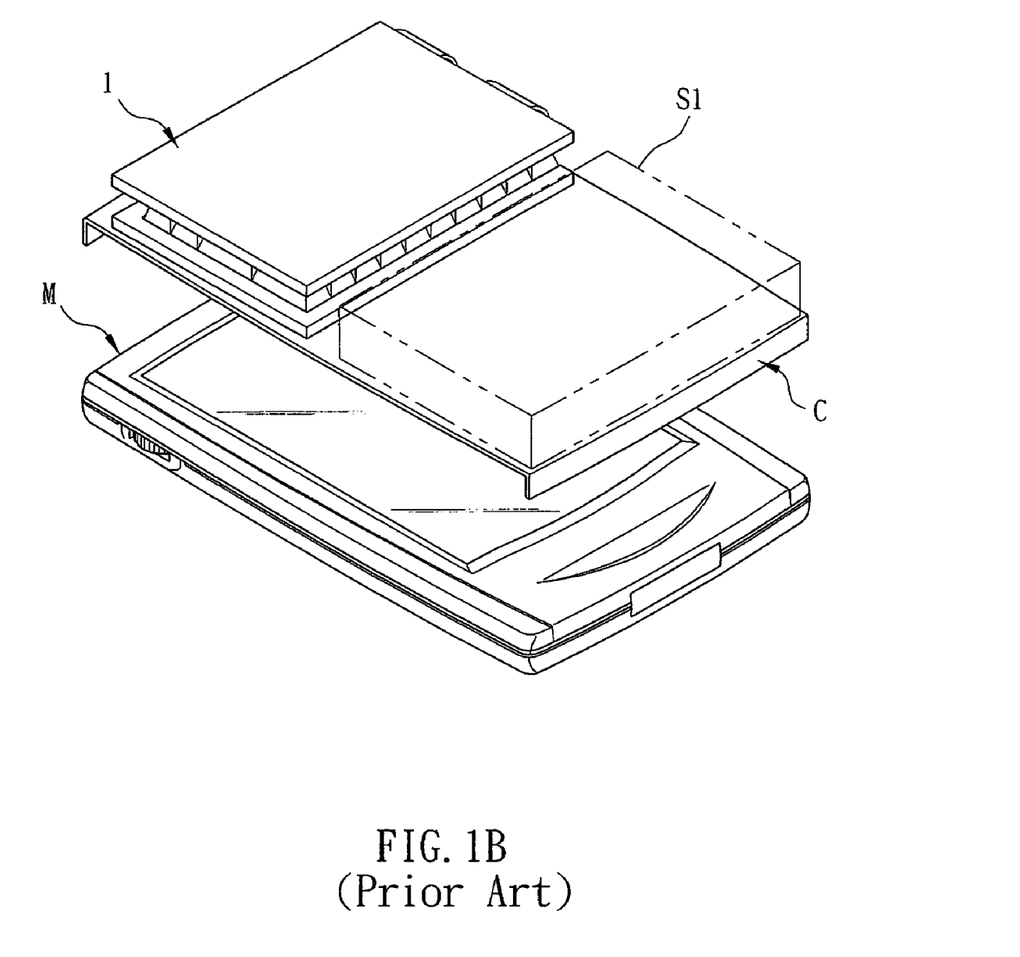
FIG. 1B is a schematic diagram of the packed foldable keyboard in the portable electronic device of FIG. 1A.

With reference to FIGS. 1A and 1B, a conventional keyboard 1 includes a first sub keyboard 11 and a second sub keyboard 12 for matching with a portable electronic device M (e.g. a PDA or an UMPC). The keyboard 1 is a foldable keyboard. As the user uses the keyboard 1, the first sub keyboard 11 and the second sub keyboard 12 may be combined together. The combined area of the first sub keyboard 11 and the second sub keyboard 12 is larger than the touch panel disposed on the portable electronic device M so as to make it easier for the users to enter the instruction. The keyboard 1 further includes a plurality of connection straps 13, which are located between the first sub keyboard 11 and the second sub keyboard 12. When the keyboard 1 are to be packed, the first sub keyboard 11 and the second sub keyboard 12 are pulled apart from the two sides and the connection straps 13 are then exposed. After that, the first sub keyboard 11 and the second sub keyboard 12 are folded in half so it is easier for the users to pack.

Other than the portable electronic device M itself, there is also a cover C for covering the device, so that the touch panel of the portable electronic device M can be protected. The first sub keyboard 11 and the second sub keyboard 12 are folded together in such keyboard 1. Then, the user may place the keyboard 1 over the top of the cover C of the portable electronic device M, such as a mobile communication device, hence the packing of the keyboard 1 is completed (shown in FIG. 1B).

Figure 2A:
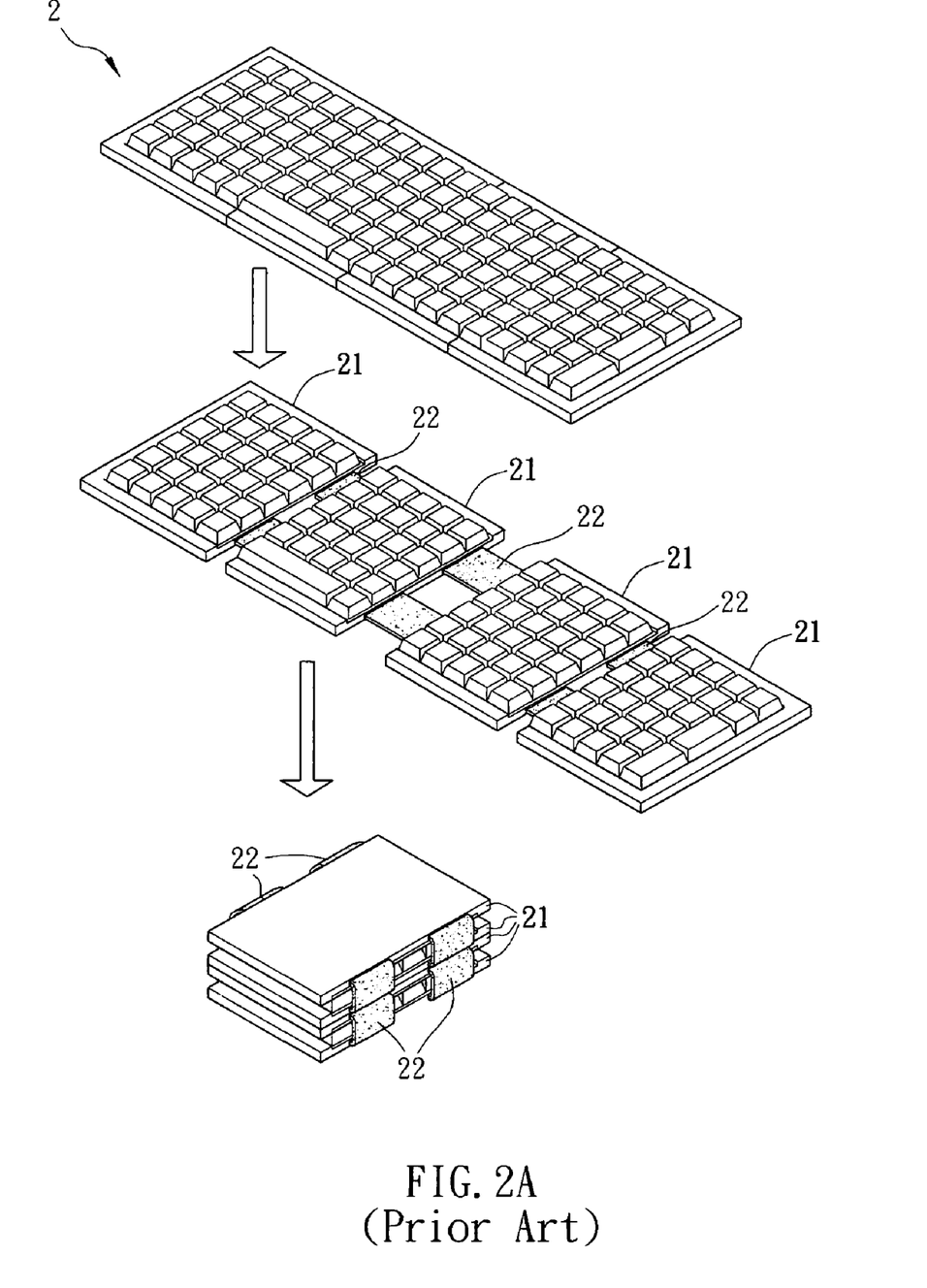
FIG. 2A is a schematic diagram of another conventional foldable keyboard of a portable electronic device.
Figure 2B:
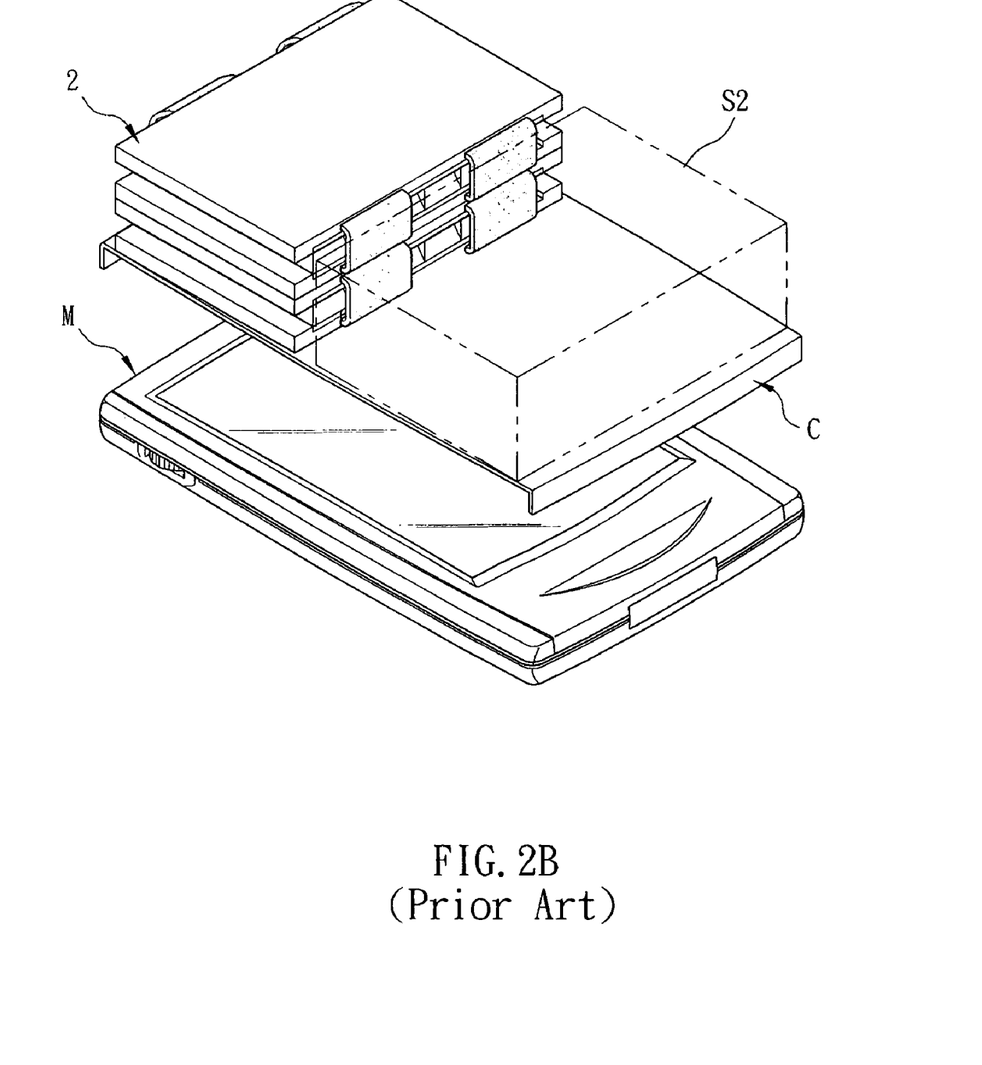
FIG. 2B is a schematic diagram of the packed foldable keyboard in the portable electronic device of FIG. 2A.

Nevertheless, when the conventional keyboard 1 and the portable electronic device M are packed together, the thickness of the folded keyboard 1 is increased so that a non-uniform remaining space S1 is formed. This is inconvenient as carrying the keyboard 1 in the bag for the extra unused space will be formed in the bag and the keyboard 1 will not be easily put into the bag. Moreover, as shown in FIGS. 2A and 2B, if the keyboard 2 has four sub keyboards 21 that are connected to each other with the connection straps 22, the thickness of the folded keyboard 21 will be larger. Thus the remaining space S2 will as well be larger, and this will make it harder to put the packed keyboard 2 into the carrying bag. In addition, it is inconvenient for the users to spend time folding or assembling the foldable keyboard 1 or 2 while packing or using it. Besides, the folding gaps appeared on the keyboards 1 and 2 are not pleasing to the eyes, and as those keyboards are folded, the damage to the keys may be resulted from improper pressing.

Therefore, it is an important subject to provide a keyboard with reduced thickness that can be easily used, packed, and carried around and protects the keystroke.

SUMMARY OF THE INVENTION

In view of the foregoing subject, an objective of the invention is to provide a keyboard, in which the keys can be packed to make it easier to carry around.

To achieve the previously described objective, a keyboard of the invention includes a first housing, a keystroke module, a second housing, and an actuating assembly. The first housing has a plurality of first magnetic elements. The keystroke module has a key portion and is disposed on the first housing. The second housing combines with the first housing and has an opening. The keystroke module is disposed corresponding to the opening. The actuating assembly that is disposed movably on the second housing has a plurality of second magnetic elements. The second magnetic elements and the first magnetic elements are separated with a distance so that the keystroke module is not protruded from the opening and is at a packing position. As the actuating assembly moves along an actuating direction, at least one first magnetic element and at least one second magnetic element attract to each other to shorten the distance. It brings the second housing to move relatively to the first housing so that the key portion of the keystroke module passes through the opening and is at a using position.

As mentioned above, in the keyboard of the invention, the magnetic elements are disposed on the first housing and the actuating assembly, respectively, and the magnetic elements are separated with a distance. Thus the keystroke module may be exposed or packed in the keyboard by the magnetism of the magnetic elements. Compared with the prior art, the keystroke module of the invention may be packed in the keyboard so as to make it easier to use in both using aspect and packing aspect. Furthermore, there is no assembling gap on the keyboard of the invention as that on the conventional keyboard, thereby improving the keyboard appearance.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 3:
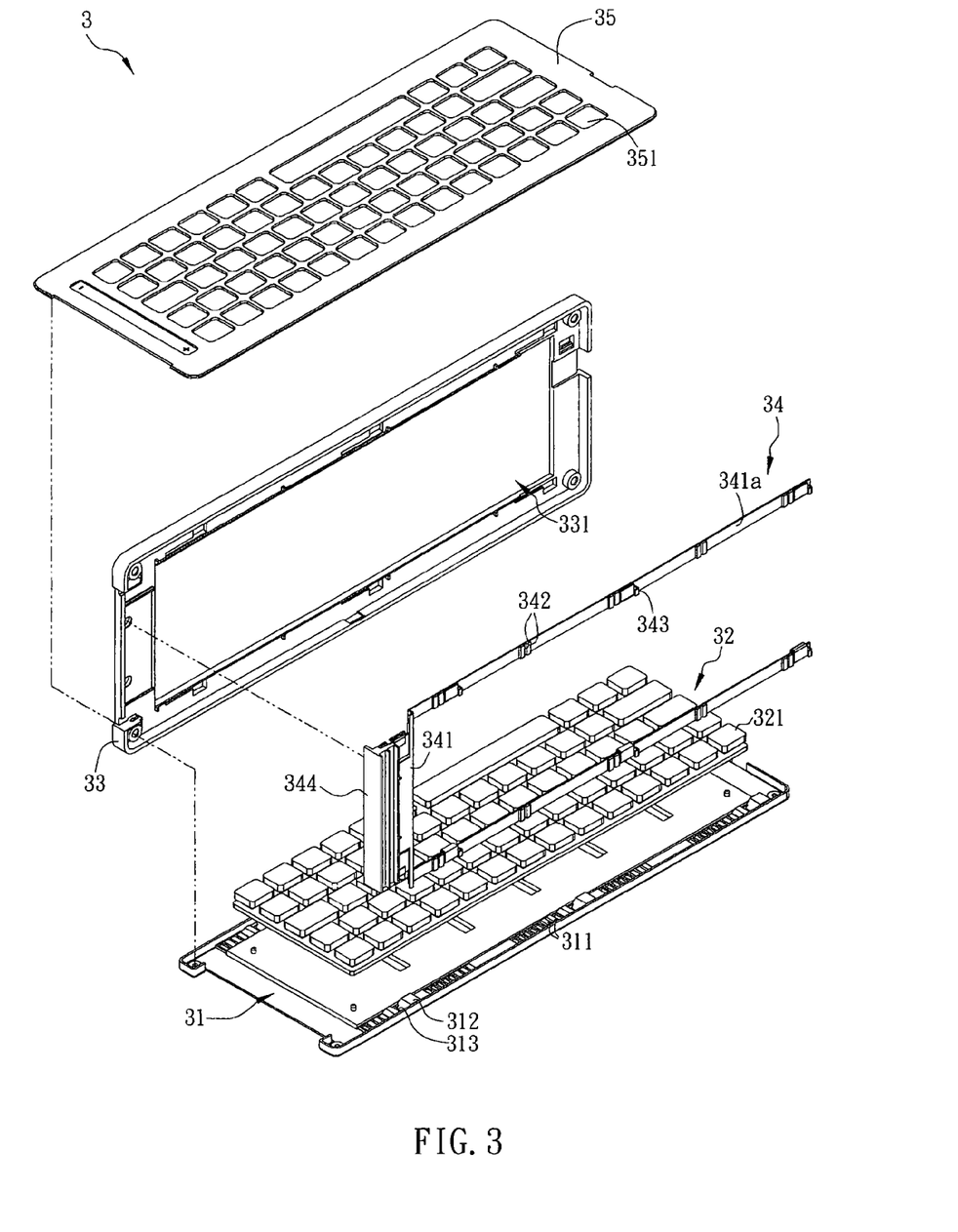
FIG. 3 is an exploded diagram of a keyboard according to a preferred embodiment of the invention.

With reference to FIG. 3, a keyboard 3 according to the preferred embodiment of the invention includes a first housing 31, a keystroke module 32, a second housing 33, and an actuating assembly 34. The keyboard 3 may be an external keyboard or a built-in keyboard of an electronic device (e.g. a personal computer, a laptop, an ultra-mobile PC, or a PDA). An external keyboard is used herein as an example of the keyboard 3.

The first housing 31 includes a plurality of first magnetic elements 311, and at least adjacent two of the first magnetic elements 311 have different polarities. In the embodiment, the first housing 31 is a lower housing of the keyboard 3. The first magnetic element 311 may be a magnet or an electromagnet. In this embodiment, the first magnetic element 311 is a magnet for example.

The keystroke module 32 includes at least one key portion 321 and is disposed on the first housing 31. The second housing 33 that combines with the first housing 31 is an upper housing of the keyboard 3 and has an opening 331. The keystroke module 32 is disposed corresponding to the opening 331.

The actuating assembly 34 is disposed on the second housing 33 and faces towards the first housing 31. The actuating assembly 34 has a base 341 and a plurality of second magnetic elements 342. The second magnetic elements 342 are disposed on the base 341 and, as the above-mentioned first magnetic elements 311, the second magnetic elements 342 are magnet. At least adjacent two of the second magnetic elements 342 have different polarities. The base 341 of the actuating assembly 34 has at least one extended part 341a along a length direction of the keystroke module 32. In the embodiment, the actuating assembly 34 with two extended parts 341a is used as an example. The second magnetic elements 342 are disposed on the extended parts 341a, and the first magnetic elements 311 are disposed corresponding to the second magnetic elements 342.

Moreover, the first housing 31 further includes at least one first protruded part 312 and a concave part 313. In the embodiment the first protruded part 312 is a protruded block and the concave part 313 is a trench. The actuating assembly 34 in the embodiment has at least one second protruded part 343 such as an extended clasp. The second protruded part is disposed on the extended part 341a and is corresponding to the first protruded part 312. The keyboard 3 further includes a protective cover 35, which has at least one hole 351, and the key portion 321 is disposed corresponding to the hole 351. The actuating assembly 34 further includes a handle 344, which is partially exposed between the first housing 31 and the second housing 33.

Figure 4A:
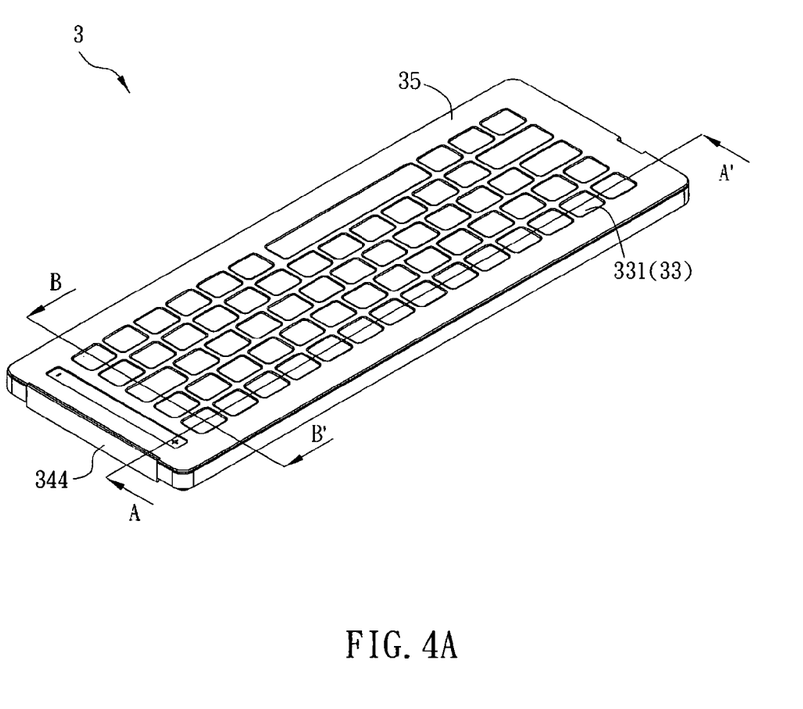
FIG. 4A is a schematic diagram of the keyboard in a packing aspect according to the preferred embodiment of the invention.
Figure 4B:
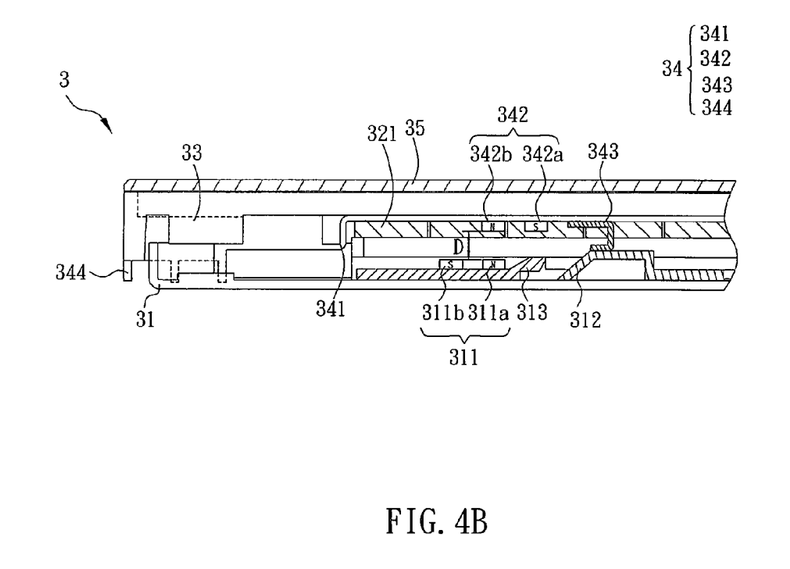
FIG. 4B is a schematic cross sectional diagram of the keyboard along the line A-A' of FIG. 4A.
Figure 4C:
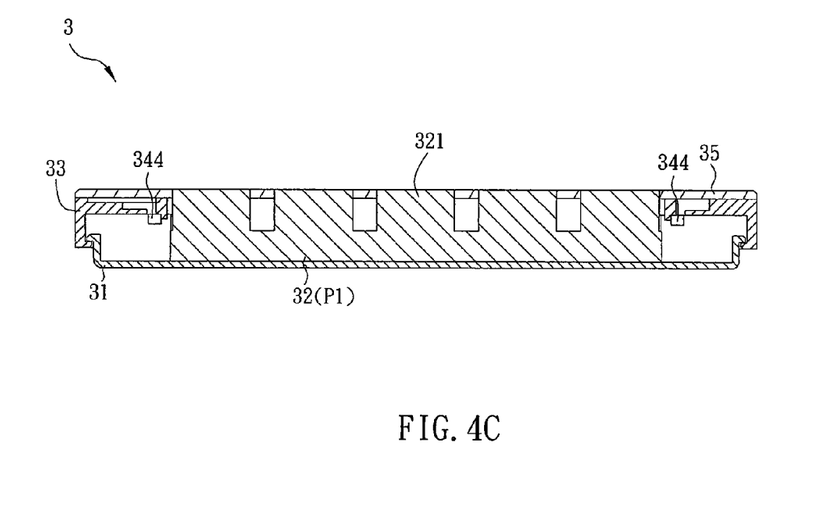
FIG. 4C is a schematic cross sectional diagram of the keyboard along the line B-B' of FIG. 4A.

FIGS. 4A to 4C are the schematic diagram and the cross sectional diagrams of the keystroke module 32 of the keyboard 3 at a packing position, respectively. Since the two adjacent first magnetic elements 311a and 311b on the first housing 31 have different polarities (e.g. the first magnetic element 311a is the N pole and the first magnetic element 311b is the S pole in FIG. 4B), the two adjacent second magnetic elements 342a and 342b on the actuating assembly 34 also have different polarities (e.g. the second magnetic element 342a is the S pole and the second magnetic element 342b is the N pole in FIG. 4B). As the keyboard 3 is in the packing aspect, since the first magnetic element 311a and the second magnetic element 342b have the same polarity, a repulsive force is generated. If such repulsive force is strong enough, the first magnetic element 311a and the second magnetic element 342b will be separated with a distance D. Meanwhile, the keystroke module 32 is not protruded from the opening of the second housing 33 so that the key portion 321 is lower than an upper surface of the protective cover 35 and at a packing position P1 (shown in FIG. 4C). As it should be, if the repulsive force between the first magnetic element 311a and the second magnetic element 342b is not strong enough, a first protruded part 312 of the first housing 31 and a second protruded part 343 of the actuating assembly 34 are pressed against each other. Thus, the second housing 33 and the actuating assembly 34 can be held, and the keystroke module 32 can be kept at the packing position P1.

Figure 4D:
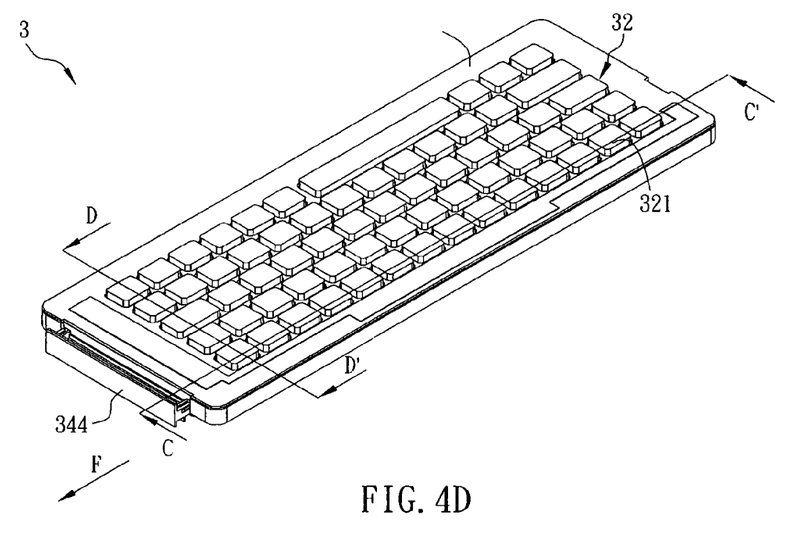
FIG. 4D is a schematic diagram of the keyboard in an using aspect according to the preferred embodiment of the invention.
Figure 4E:
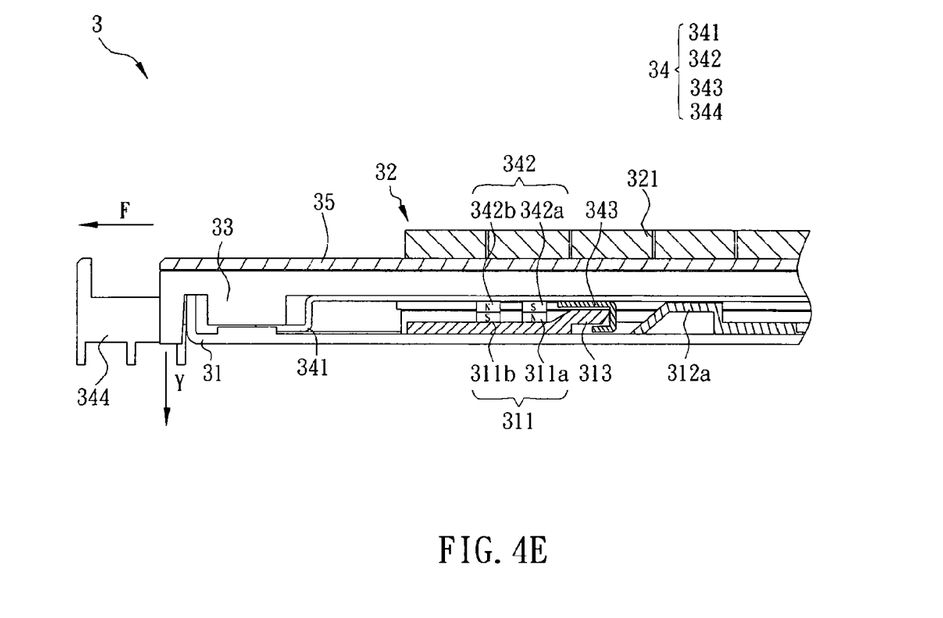
FIG. 4E is a schematic cross sectional diagram of the keyboard along the line C-C' of FIG. 4E.
Figure 4F:
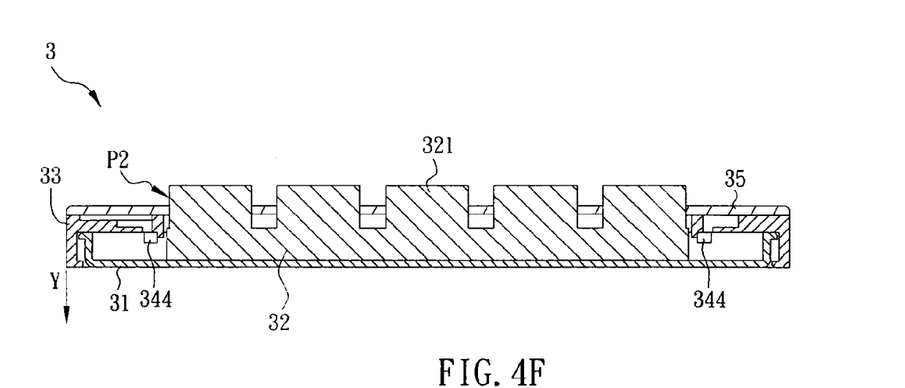
FIG. 4F is a schematic cross sectional diagram of the keyboard along the line D-D' of FIG. 4D.

FIGS. 4D to 4F are the schematic diagram and the cross sectional diagrams of the keyboard 3 at a using aspect, respectively. As the handle 344 of the actuating assembly 34 moves along an actuating direction F, the handle 344 brings the base 341 and the second magnetic elements 342a and 342b to move along the same direction. The first magnetic elements 311a and 311b and the second magnetic elements 342a and 342b with different polarities attract to each other so as to shorten the distance D. Since the first housing 31 and the second housing 33 are cogged but are not locked to each other, the attraction between the first magnetic elements 311a and 311b and the second magnetic elements 342a and 342b may bring the second housing 33 to move relatively to the first housing 31 along a sinking direction Y. Meanwhile, because the keystroke module 32 is fixed on the first housing 31, after the second housing 33 is moved, the key portion 321 of the keystroke module 32 passes through the opening 331. Accordingly, a top of the key portion 321 is over an upper surface of the protective cover 35 and at a using position P2 (shown in FIG. 4F) so as to make it easier for the users to enter the instruction.

It is to be noted, in the embodiment, as the keyboard 3 switches from the packing aspect to the using aspect, the sinking direction Y that the second housing 33 moves along is perpendicular to the actuating direction F. In addition, in order to firmly connect the first housing 31 and the second housing 33 in the using aspect, the first housing 31 may have a concave part 313. As the second housing 33 relatively moves to the using position P2, the second protruded part 343 and the concave part 313 may be cogged with each other (shown in FIG. 4E) so as to increase the reliability of the keyboard 3.

Figure 5:
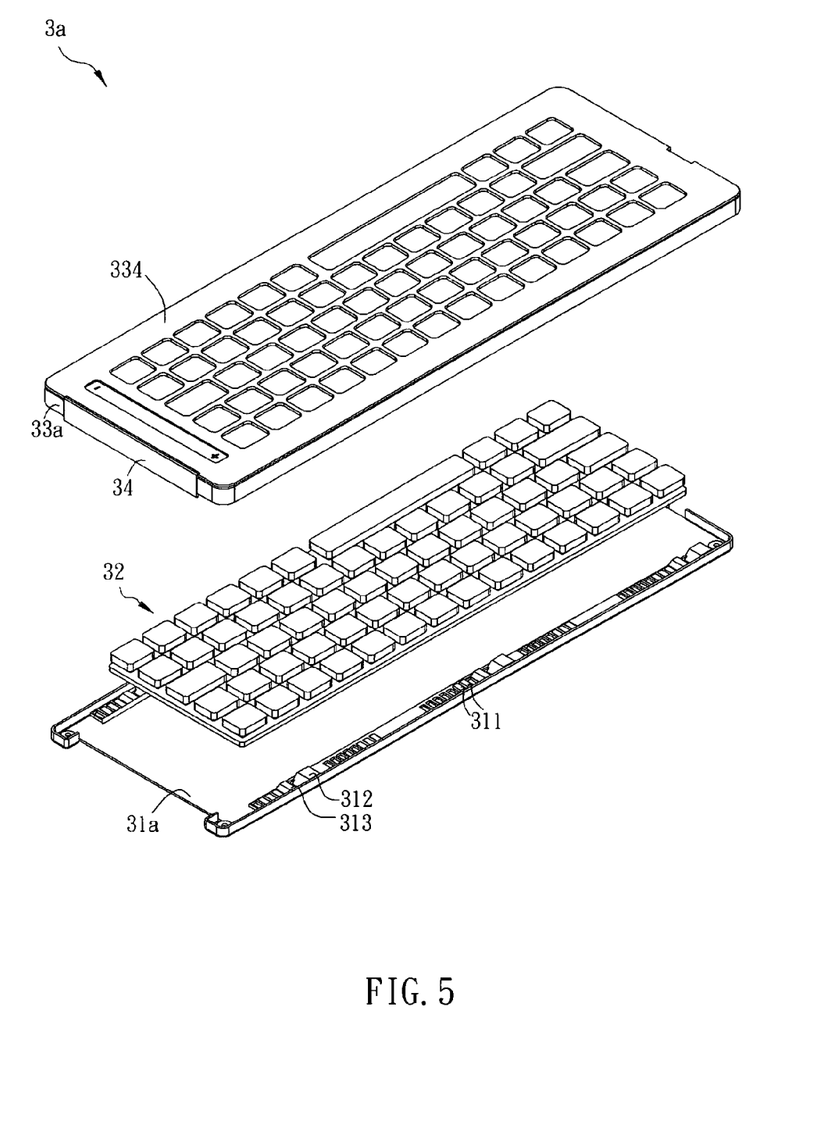
FIG. 5 is a schematic diagram of a keyboard according to another preferred embodiment of the invention.

With reference to FIG. 5, another keyboard 3a according to the embodiment of the invention includes a first housing 31a, a keystroke module 32, a second housing 33a, and an actuating assembly 34. Since the keystroke module 32 and the actuating assembly 34 of the keyboard 3a are described in the keyboard 3 of the previous embodiment, a detailed description will be omitted. The difference between the first housing 31a and the second housing 33a of the embodiment and these of the previous embodiment is that the first protruded part 312 and the concave part 313 of the first housing 31a may be integrally formed with the first housing 31a directly. Additionally, the protective cover 35 of the above-mentioned embodiment may also be integrally formed with the second housing 33 to form the second housing 33a of this embodiment so as to simplify the structure.

To sum up, according to the keyboard of the invention, the magnetic elements are respectively disposed on the first housing and the actuating assembly, and the magnetic elements are separated with a distance. Thus the keystroke module may be exposed from or packed in the keyboard by the magnetism of the magnetic elements. Compared with the prior art, the keystroke module of the keyboard according to the invention may be packed in the keyboard when it is not in use so as to make the keyboard handier in the using aspect and in the packing aspect. There is also no assembling gap on the keyboard of the invention as that on the keyboard of the conventional invention, so that the appearance of the keyboard can be improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A keyboard, comprising:
a first housing having a plurality of first magnetic elements;
a keystroke module having a key portion disposed on the first housing;
a second housing combining with the first housing and having an opening, wherein the keystroke module is disposed corresponding to the opening; and
an actuating assembly disposed movably on the second housing and having a plurality of second magnetic elements, wherein the second magnetic elements and the first magnetic elements are separated with a distance so that the keystroke module is not protruded from the opening and is disposed at a packing position;
wherein when the actuating assembly is moved along an actuating direction, at least one of the first magnetic elements and at least one of the second magnetic elements attract to each other to shorten the distance, thereby bringing the second housing to move relatively to the first housing so that the key portion of the keystroke module passes through the opening and is then disposed at a using position.

2. The keyboard according to claim 1, wherein the actuating assembly further has a base, and the second magnetic elements are disposed on the base.

3. The keyboard according to claim 2, wherein the base of the actuating assembly has at least one extended part along a length direction of the keystroke module.

4. The keyboard according to claim 3, wherein the second magnetic elements are disposed on the extended part.

5. The keyboard according to claim 1, wherein at least adjacent two of the first magnetic elements have different polarities.

6. The keyboard according to claim 1, wherein at least adjacent two of the second magnetic elements have different polarities.

7. The keyboard according to claim 1, wherein each of the first magnetic elements and the second magnetic elements is a magnet or an electromagnet, respectively.

8. The keyboard according to claim 1, wherein when the keystroke module is at the packing position, at least one of the first magnetic elements and at least one of the second magnetic elements repel each other.

9. The keyboard according to claim 1, wherein the actuating assembly further has a handle partially exposed from the first housing and the second housing.

10. The keyboard according to claim 9, wherein when the handle moves along the actuating direction, the handle brings the second magnetic elements to move along the actuating direction.

11. The keyboard according to claim 1, wherein the first housing further has at least one first protruded part, the actuating assembly has at least one second protruded part, and the first protruded part is disposed corresponding to the second protruded part.

12. The keyboard according to claim 11, wherein when the keystroke module is at the packing position, the first protruded part and the second protruded part are pressed against each other.

13. The keyboard according to claim 11, wherein the first housing has a concave part, and when the keystroke module is at the using position, the second protruded part and the concave part are cogged with each other.

14. The keyboard according to claim 1 further comprising a protective cover having at least one hole, wherein the key portion is disposed corresponding to the hole.

15. The keyboard according to claim 14, wherein when the keystroke module is at the using position, a top of the key portion is over an upper surface of the protective cover.

16. The keyboard according to claim 1, wherein when the keystroke module is moved from the packing position to the using position, the second housing moves along a sinking direction.

17. The keyboard according to claim 16, wherein the sinking direction is perpendicular to the actuating direction.

* * * * *